Feb. 9, 1932.　　　　J. B. AUFULDISH　　　　1,844,086
VALVE MECHANISM
Filed June 1, 1926　　　2 Sheets-Sheet 1

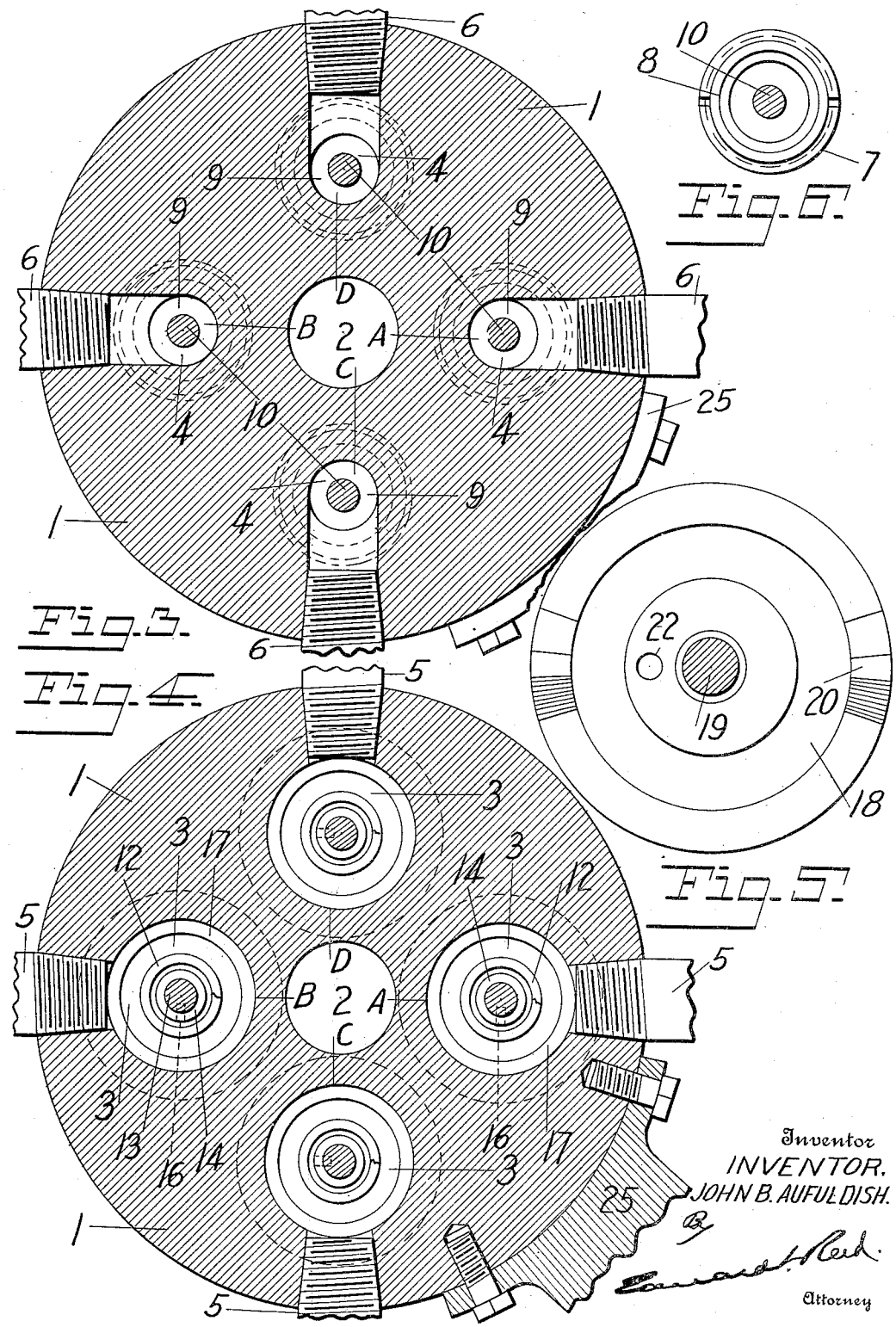

Patented Feb. 9, 1932

1,844,086

UNITED STATES PATENT OFFICE

JOHN B. AUFULDISH, OF DAYTON, OHIO, ASSIGNOR TO THE MULTIPLE VALVE & MANUFACTURING COMPANY, OF DAYTON, OHIO, A CORPORATION OF OHIO

VALVE MECHANISM

Application filed June 1, 1926. Serial No. 112,922.

This invention relates to a valve mechanism and one object of the invention is to provide means whereby a plurality of valves, each controlling a flow of fluid through a separate conduit, may be individually controlled by the manipulation of a single actuating device.

A further object of the invention is to provide such a mechanism which will be simple in its construction and operation, compact in arrangement and inexpensive to manufacture.

A further object of the invention is to provide such a mechanism from which any one of the valve units may be individually removed for repair or replacement without disturbing the other parts of the mechanism.

Other objects of the invention will appear as the device is described in detail.

In the accompanying drawings Fig. 1 is a top plan view of a mechanism embodying my invention; Fig. 2 is a vertical sectional view taken on the line 2—2 of Fig. 1; Fig. 3 is a transverse section taken on the line 3—3 of Fig. 2; Fig. 4 is a transverse section taken on the line 4—4 of Fig. 2; Fig. 5 is a bottom plan view of the actuating device; and Fig. 6 is a bottom plan view of the valve seat of one of the valve units.

In these drawings I have illustrated one embodiment of my invention and have shown the same as designed primarily for use in connection with a water softening apparatus and as having means for controlling four conduits. It will be understood, however, that the device may be used in connection with apparatus of different kinds, as for example, with presses for bakelite and the like; that the number of conduits controlled may be varied by the addition or subtraction of valve units; and that the various parts of the mechanism may take various forms without departing from the spirit of the invention.

As has been stated, the particular valve here shown is designed for use on a water softening apparatus of that type in which the water softening element comprises a mineral of the changeable base type, such as zeolite or glauconite. When hard water is passed through such a mineral the mineral gives up its normal base and absorbs the substances which harden the water and as these substances are absorbed the mineral gradually loses its efficiency and it becomes necessary to recondition the same to restore its water softening characteristics. This is accomplished by subjecting the mineral to the action of salt water which displaces the absorbed substances and restores its normal base. The water to be softened is admitted to such a water softener through a hard water supply pipe which is controlled by a valve and the soft water is discharged therefrom through a service pipe which is also controlled by a valve. The salt solution may be supplied to the mineral to recondition the same in various ways, one of the simplest methods being to provide a salt pot communicating with the interior of the water softener tank and to which the water is admitted through a supply pipe controlled by a valve. This water dissolves the salt and the salt water flows into the tank and through the mineral and is discharged from the tank through a waste pipe leading to the sewer and controlled by a valve. The flow of water through the salt pot to the sewer continues until the salt has been exhausted and for a further time sufficient to remove all salt water from the tank. It will be apparent therefore that in the operation of this simplest form of water softening apparatus there are four valves to be manipulated and that in the normal water softening operation the hard water supply pipe valve and the soft water valve are open, the salt valve and the sewer valve being closed. When the softener is to be reconditioned the hard water valve and the soft water valves are closed and the salt water valve and sewer valve opened. With other types of water softening apparatus, such as those employing a back wash as a part of the reconditioning operation additional valves are required. In the present apparatus I have provided means whereby these several valves, or their equivalent controlling devices, may be properly positioned at the will of the operator by the manipulation of a single actuating device, thereby simplifying the operation and eliminating the possibility of mistake.

In that embodiment of the invention here illustrated the several valves are arranged within a single valve casing which is provided with valve chambers having passageways by means of which they may be interposed in the several conduits which are to be controlled. The valve casing here shown comprises a single block of metal or casting 1 which, if desired, may be cored out, as shown at 2, and which has formed therein a plurality of valve chambers, in the present instance four, as shown at A, B, C, and D. Each valve chamber comprises two parts which may be referred to as the lower part 3 and the upper part 4. In the present arrangement the lower part of each valve chamber is connected with an inlet pipe 5 and the upper part thereof is connected with an outlet pipe 6 the two pipes together with the passageway through the valve casing constituting the conduit which is to be controlled. Arranged between the upper and lower parts 3 and 4 of each valve chamber is a valve seat 7 which, in the present instance, comprises an annular member screw threaded into the valve chamber and provided with a relatively narrow annular portion 8 constituting the valve seat proper. Cooperating with this valve seat is a tapered valve member 9 which is rigidly secured to a stem 10 which extends upwardly through the upper portion 4 of the valve chamber and through a stuffing box 11 mounted in the upper portion of the valve casing. A spring 12 confined between the valve member 9 and the bottom of the valve chamber tends to move the valve member into contact with the valve seat. Because of the relatively narrow character of the valve seat with which the tapered surface of the valve member contacts there is little likelihood of foreign matter adhering thereto and preventing the proper seat of the valve. To positively prevent any accumulation of foreign matter on the valve seat or on the valve member at its point of contact with the valve seat I have provided means for imparting a slight turning movement to the valve at the instant it engages the valve seat, which movement will serve to wipe off any matter which may have adhered thereto. For this purpose the valve member 9 has secured thereto a downwardly extending rod or stem 13, the lower end of which is seated in a socket 14 mounted on the bottom of the valve chamber. This rod is provided with a spiral groove 15 into which extends a pin 16 mounted in the wall of the socket. Consequently the reciprocatory movement of the valve rod as the valve member is moved toward and from its seat will cause rotatory movement to be imparted thereto. Preferably the outer end of each valve chamber is provided with a removable closure such as a screw threaded plug or cap 17 and by removing this closure the entire valve unit or any part thereof may be removed for the purpose of repair or replacement.

In the particular mechanism here illustrated the valve chamber A is interposed in the hard water conduit which supplies the water which is to be softened to the tank of the water softener. The valve chamber B is interposed in the soft water conduit through which the soft water is delivered to the service line. The valve chamber C is interposed in the water line leading to the salt pot, which conduit is herein characterized as the salt water conduit, and the valve chamber D is interposed in the drain pipe which leads from the tank to the sewer. By the proper manipulation of the valves in these several valve chambers the flow of fluid through the several conduits may be so controlled as to effect the desired operations.

Mounted upon the upper end of the valve casing is an actuating device arranged to act upon the several valve stems 10 and control the positions of the valve members with relation to their respective seats. In the present construction this actuating device comprises a hand wheel or knob 18 which is rotatably mounted on a stud 19 threaded into the upper portion of the casing 1 substantially centrally thereof. This hand wheel is provided on its inner side with a cam surface, as shown at 20, which acts upon the upper ends of the several valve stems. As here shown, the valve stems are provided with rollers 21 which contact with the cam for the purpose of reducing the friction between the parts. If desired, a spring pressed detent may be provided, as shown at 22, which will enter recesses 23 in the upper surface of the valve casing and hold the actuating member against accidental displacement. The actuating member or hand wheel is provided on the upper portion thereof with suitable indicators, such as the arrows 24, which cooperate with suitable indications on the upper end of the valve casing to indicate the positions of the several valves. As here shown, the valve casing is provided, adjacent to each valve, with a legend designating by name the conduit which is controlled by that valve. In the present construction the cam surface of the actuating device is provided with two projections arranged on diametrically opposite sides thereof and adapted to simultaneously engage corresponding valve stems on opposite sides of the casing. With the actuating member in the position shown in Figs. 1 and 2 the cam projections are in engagement with the stems of the valves in valve chambers A and B, which chambers form part of the hard water conduit and soft water conduit respectively, and hold these valves in their open positions. The valves in chambers C and D being out of line with the projections on the cam surface are held in their closed positions by their springs 12. When the water softener is to be reconditioned a quarter turn is imparted to the actuating handle to bring the arrows 24 into line with the legend "Salt water" and "Sewer" respectively, thus releasing the valves in chambers A and B and opening the valves in chambers C and D. If it is desired to close all the valves the actuating device is moved into an intermediate position as indicated by the words "Off" on the casing.

The mechanism may be mounted in any suitable manner but when applied to a softening apparatus I prefer to mount it on the side of the tank and to this end a supporting bracket 25 is secured to one side of the casing and adapted to be secured to the tank so as to support the valve casing in proper relation thereto and in such a position that the several pipes may be conveniently connected with the respective valve chambers.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a valve mechanism, a casing having a plurality of valve chambers and having an inlet and an outlet leading to and from each valve chamber, each valve chamber having a valve seat interposed between said inlet and said outlet, valve members to cooperate with the respective valve seats, springs acting on the respective valve members to move the same toward their seats, a single actuating device to move selected valve members against the action of said springs, and means to impart rotatory movement to each valve member as it is moved into contact with its seat.

2. In a valve mechanism, a casing having a plurality of valve chambers and having an inlet and an outlet leading to and from each valve chamber, each valve chamber having a valve seat interposed between said inlet and said outlet, valve members to cooperate with the respective valve seats, springs acting on the respective valve members to move the same toward their seats, a valve stem connected with each of said valve members extending through the end wall of said casing, an actuating device having means to move said valve members against the action of said springs, a stem extending downwardly from each of said valve members and having a spiral slot, and a fixed stud extending into said slot to impart rotatory movement to said valve member when the latter is moved toward its seat.

3. In a valve mechanism, a structure having two pairs of conduits, each pair including an inlet conduit and an outlet conduit, means for connecting the inlet conduit of each pair with a source of supply for fluid, means for connecting the outlet conduit of each pair with a point of discharge, and means for connecting the inlet conduit of each pair with the outlet conduit of that pair, a valve in each conduit, means for simultaneously opening the valves for either pair of conduits to cause the fluid which enters through the inlet conduit of that pair to be discharged through the outlet conduit of said pair while the valves of the other pair of conduits remain closed.

4. In a valve mechanism, a structure having two pairs of conduits, each pair including an inlet conduit and an outlet conduit, means for connecting the inlet conduits of the respective pairs with separate sources of supply for fluid, means for connecting the outlet conduits of the respective pairs with separate points of discharge, means for connecting the inlet conduit of each pair with the outlet conduit of that pair, a valve in each conduit, and an actuating device having means to open the valves of a selected pair of conduits while the valves of the other pair remain closed and thus cause the fluid entering through the inlet conduit of the selected pair to be discharged through the outlet conduit of that pair.

In testimony whereof, I affix my signature hereto.

JOHN B. AUFULDISH.